US012002445B2

(12) United States Patent
Kobayashi et al.

(10) Patent No.: US 12,002,445 B2
(45) Date of Patent: Jun. 4, 2024

(54) CANCEL FILTER COEFFICIENT GENERATION METHOD, CANCEL FILTER COEFFICIENT GENERATION APPARATUS, AND PROGRAM

(71) Applicant: NIPPON TELEGRAPH AND TELEPHONE CORPORATION, Tokyo (JP)

(72) Inventors: Kazunori Kobayashi, Tokyo (JP); Masahiro Fukui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 85 days.

(21) Appl. No.: 17/918,295

(22) PCT Filed: Apr. 16, 2020

(86) PCT No.: PCT/JP2020/016677
§ 371 (c)(1),
(2) Date: Oct. 11, 2022

(87) PCT Pub. No.: WO2021/210120
PCT Pub. Date: Oct. 21, 2021

(65) Prior Publication Data
US 2023/0274724 A1 Aug. 31, 2023

(51) Int. Cl.
*G10K 11/178* (2006.01)

(52) U.S. Cl.
CPC .. *G10K 11/17853* (2018.01); *G10K 11/17823* (2018.01); *G10K 11/17825* (2018.01)

(58) Field of Classification Search
CPC ....... G10K 11/17823; G10K 11/17825; G10K 11/17853; G10K 11/17817; G10K 11/17854; G10K 11/17881; G10K 11/178
See application file for complete search history.

(56) References Cited

FOREIGN PATENT DOCUMENTS

| | | | |
|---|---|---|---|
| JP | 0822292 | A | 1/1996 |
| JP | 2000347671 | A | 12/2000 |

(Continued)

OTHER PUBLICATIONS

Active noise control (IEICE "Forest of Knowledge" Group 2—Section 6—Chapter 6), [online] Accessed on Mar. 26, 2020, website: <URL:http://www.ieice-hbkb.org/files/02/02gun_06hen_06.pdf> with English translation generated by computer.

*Primary Examiner* — Kile O Blair

(57) ABSTRACT

Provided is a technology for generating an elimination filter coefficient for suppressing degradation of noise elimination performance. An elimination filter coefficient generation method for inputting a reference signal output from a reference microphone for collecting noise and an error signal output from an error microphone for collecting sound at a position that needs to be silent, and generating an elimination filter coefficient used for filtering for generating an elimination signal for eliminating noise at the position that needs to be silent from the reference signal includes: a route filtering step for generating a filtered reference signal from the reference signal by filtering using a route filter coefficient indicating acoustic characteristics of a route from a speaker for emitting sound based on the elimination signal to the error microphone; a first noise signal generation step for generating a predetermined signal as a first noise signal; a noise signal addition step for generating an added reference signal from the filtered reference signal and the first noise signal; and an elimination filter coefficient generation step for generating the elimination filter coefficient from the error signal and the added reference signal.

11 Claims, 9 Drawing Sheets

(56) References Cited

FOREIGN PATENT DOCUMENTS

| | | | |
|---|---|---|---|
| JP | 2012103329 | A | 5/2012 |
| WO | 2016199341 | A1 | 12/2016 |

FREQUENCY CHARACTERISTICS OF SPEAKER

CONVERGENCE CHARACTERISTICS OF ELIMINATION FILTER COEFFICIENT

CANCEL FILTER COEFFICIENT GENERATION METHOD, CANCEL FILTER COEFFICIENT GENERATION APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2020/016677, filed on 16 Apr. 2020, the disclosure of which is hereby incorporated herein by reference in its entirety.

TECHNICAL FIELD

The present invention relates to an active noise control technology.

BACKGROUND ART

As a system for eliminating noise by using an active noise control technology (hereinafter referred to as "noise elimination system"), for example, a system in NPL 1 is disclosed.

Referring to FIG. 1 and FIG. 2, a noise elimination system 1000 is described below. FIG. 1 is a block diagram illustrating a configuration of the noise elimination system 1000. FIG. 2 is a flowchart illustrating an operation of the noise elimination system 1000. As illustrated in FIG. 1, the noise elimination system 1000 includes a reference microphone 1010, an error microphone 1020, an elimination filter coefficient generation apparatus 900, an elimination filter 1030, and a speaker 1040.

Referring to FIG. 2, the operation of the noise elimination system 1000 is described.

In S1010, the reference microphone 1010 collects noise in a predetermined space, and outputs a reference signal. The predetermined space is a space where a noise source is present. The reference microphone 1010 collects sound from the noise source. In S1020, the error microphone 1020 collects sound at a position that needs to be silent, and outputs an error signal. The error microphone 1020 collects sound from the noise source and sound from the speaker 1040, which is a secondary sound source.

In S900, the elimination filter coefficient generation apparatus 900 inputs the reference signal output in S1010 and the error signal output in S1020 to generate an elimination filter coefficient, and outputs the elimination filter coefficient. The elimination filter coefficient is used for filtering for generating an elimination signal for eliminating noise at a position that needs to be silent from the reference signal.

In S1030, the elimination filter 1030 inputs the reference signal output in S1010 and the elimination filter coefficient output in S900, generates an elimination signal from the reference signal by filtering using the elimination filter coefficient, and outputs the elimination signal. The elimination signal is a signal for eliminating noise at a position that needs to be silent (that is, installation position of error microphone 1020), and is a signal input to the speaker 1040.

In S1040, the speaker 1040 inputs the elimination signal output in S1030 to emit sound based on the elimination signal. The sound based on the elimination signal is sound in antiphase to noise at the position that needs to be silent.

Referring to FIG. 3 and FIG. 4, the elimination filter coefficient generation apparatus 900 is described. FIG. 3 is a block diagram illustrating a configuration of the elimination filter coefficient generation apparatus 900. FIG. 4 is a flowchart illustrating an operation of the elimination filter coefficient generation apparatus 900. As illustrated in FIG. 3, the elimination filter coefficient generation apparatus 900 includes a route filter 910 and an elimination filter coefficient generation unit 920.

Referring to FIG. 4, the operation of the elimination filter coefficient generation apparatus 900 is described.

In S910, the route filter 910 inputs the reference signal output in S1010, generates a filtered reference signal from the reference signal by filtering using a route filter coefficient indicating acoustic characteristics of a route from the speaker 1040 to the error microphone 1020, and outputs the filtered reference signal.

In S920, the elimination filter coefficient generation unit 920 inputs the error signal output in S1020 and the filtered reference signal output in S910 to generate an elimination filter coefficient from the error signal and the filtered reference signal, and outputs the elimination filter coefficient. As an adaptive algorithm for sequentially generating an elimination filter coefficient, for example, the LMS (Least Mean Squares) algorithm, the NLMS (Normalized Least Mean Squares) algorithm, the RLS (Recursive Least Squares) algorithm, and the projection algorithm disclosed in reference patent literature 1 can be used.

(Reference patent literature 1: Japanese Patent Application Publication No. 2006-135886)

In these adaptive algorithms, an elimination filter coefficient is learned such that the root mean square of an error signal is minimized, and hence noise at an installation position of the error microphone 1020 is minimized, and a silent space where noise level is low is created near the installation position of the error microphone 1020.

CITATION LIST

Non Patent Literature

[NPL 1] Active noise control (IEICE "Forest of Knowledge" Group 2-Section 6-Chapter 6), [online], [3.26.2020 searched], Internet <URL: http://www.ieice-hbkb.org/files/02/02gun_06hen06.pdf>

SUMMARY OF THE INVENTION

Technical Problem

However, a speaker cannot reproduce any sound, and distortion occurs if a signal exceeding the specification range of the speaker is input. Thus, when an elimination filter coefficient is generated by using an adaptive algorithm that does not take frequency characteristics of a speaker into consideration, noise elimination performance may degrade.

Specific description is made below. In general, a speaker has a minimum reproduction frequency $F_{min}$ and a maximum reproduction frequency $F_{max}$, and the speaker cannot reproduce large sound in a low frequency band lower than the minimum reproduction frequency $F_{min}$ and in a high frequency band higher than the maximum reproduction frequency $F_{max}$ (see FIG. 5). This is because of mechanical characteristics (for example, elasticity and weight) of a vibration part of the speaker and because it is difficult to vibrate the vibration part of the speaker slowly and greatly and it is difficult to vibrate the vibration part of the speaker quickly. In other words, when the speaker is driven by inputting a signal in a low frequency band lower than the minimum reproduction frequency $F_{min}$ or in a high frequency band higher than the maximum reproduction frequency $F_{max}$, the vibration part of the speaker is hard to vibrate, and hence the reproduction volume decreases although the speaker can vibrate to emit sound in the frequency band.

When the speaker is driven by inputting a large signal in a low frequency band lower than the minimum reproduction frequency Frain or in a high frequency band higher than the maximum reproduction frequency $F_{max}$, the movement range exceeds the movable range of the vibration part of the speaker or the capacity of a driving amplifier is exceeded, and hence distortion occurs in a reproduction frequency band (that is, band from minimum reproduction frequency $F_{min}$ to maximum reproduction frequency $F_{max}$) and noise elimination performance degrades in all frequency bands.

It is therefore an object of the present invention to provide a technology for generating an elimination filter coefficient for suppressing degradation of noise elimination performance.

Means for Solving the Problem

One aspect of the present invention provides an elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, the elimination filter coefficient generation method including: a route filtering step for generating a filtered reference signal from the reference signal by filtering using a route filter coefficient indicating acoustic characteristics of a route from a speaker for emitting sound based on the elimination signal to the error microphone; a first noise signal generation step for generating a signal having predetermined frequency characteristics and level as a first noise signal; a noise signal addition step for generating an added reference signal from the filtered reference signal and the first noise signal; and an elimination filter coefficient generation step for generating the elimination filter coefficient from the error signal and the added reference signal.

One aspect of the present invention provides an elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, the elimination filter coefficient generation method including: a route filtering step for generating a filtered reference signal from the reference signal by filtering using a route filter coefficient indicating acoustic characteristics of a route from a speaker for emitting sound based on the elimination signal to the error microphone; a reproduction filter coefficient generation step for generating, from the reference signal, a reproduction filter coefficient indicating frequency characteristics of the reference signal; a first noise signal generation step for generating a signal having predetermined frequency characteristics and level as a first noise signal; a reproduction filtering step for generating a filtered first noise signal from the first noise signal by filtering using the reproduction filter coefficient; a noise signal addition step for generating an added reference signal from the filtered reference signal and the filtered first noise signal; and an elimination filter coefficient generation step for generating the elimination filter coefficient from the error signal and the added reference signal.

One aspect of the present invention provides an elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, the elimination filter coefficient generation method including: a route filtering step for generating a filtered reference signal from the reference signal by filtering using a route filter coefficient indicating acoustic characteristics of a route from a speaker for emitting sound based on the elimination signal to the error microphone; a second noise signal generation step for generating a second noise signal by applying a predetermined gain to the reference signal to add a predetermined delay; a noise signal addition step for generating an added reference signal from the filtered reference signal and the second noise signal; and an elimination filter coefficient generation step for generating the elimination filter coefficient from the error signal and the added reference signal.

One aspect of the present invention provides an elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, in which the elimination filter coefficient has no frequency band having a gain that generates a signal exceeding reproduction capability of a speaker for emitting sound based on the elimination signal.

Effects of the Invention

According to the present invention, an elimination filter coefficient for suppressing degradation of noise elimination performance can be generated.

DESCRIPTION OF EMBODIMENTS

Figure 1:
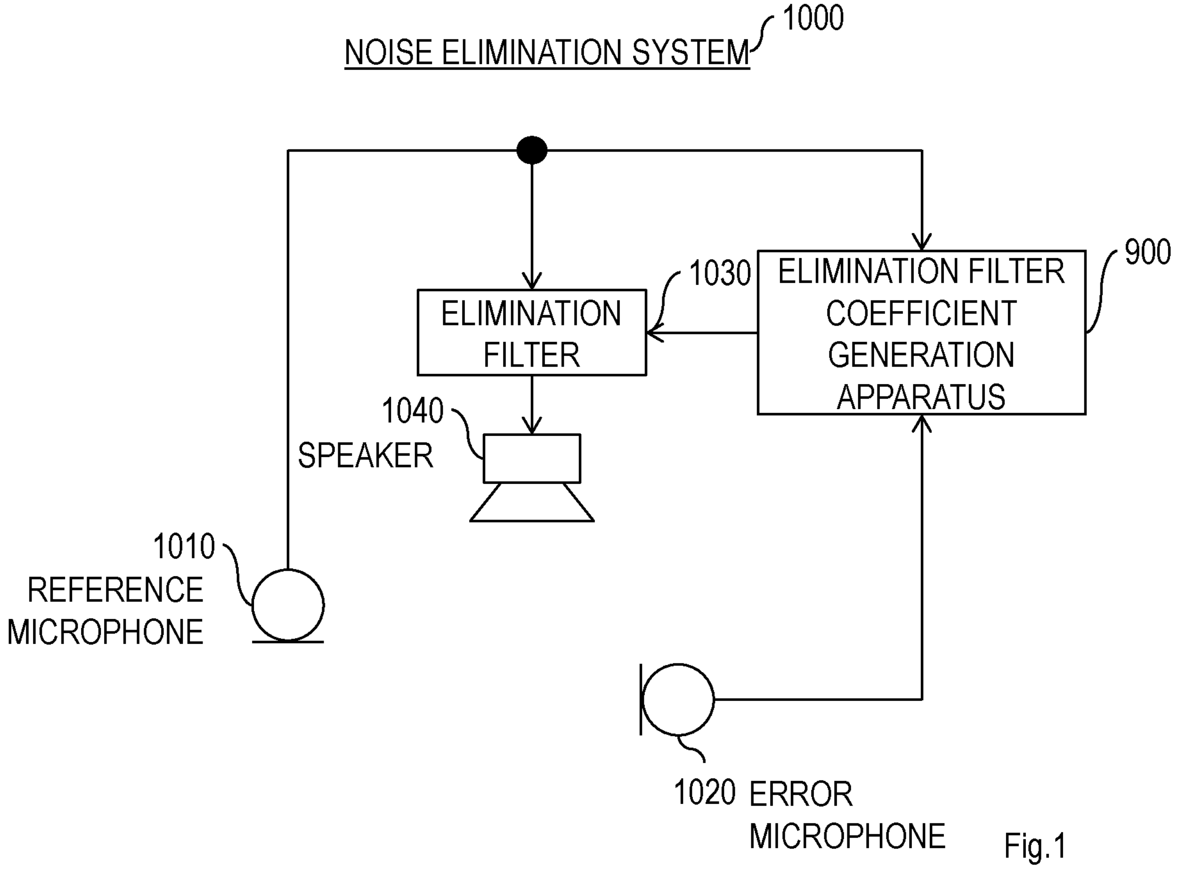
FIG. 1 is a block diagram illustrating an example of a configuration of a noise elimination system 1000.
Figure 2:
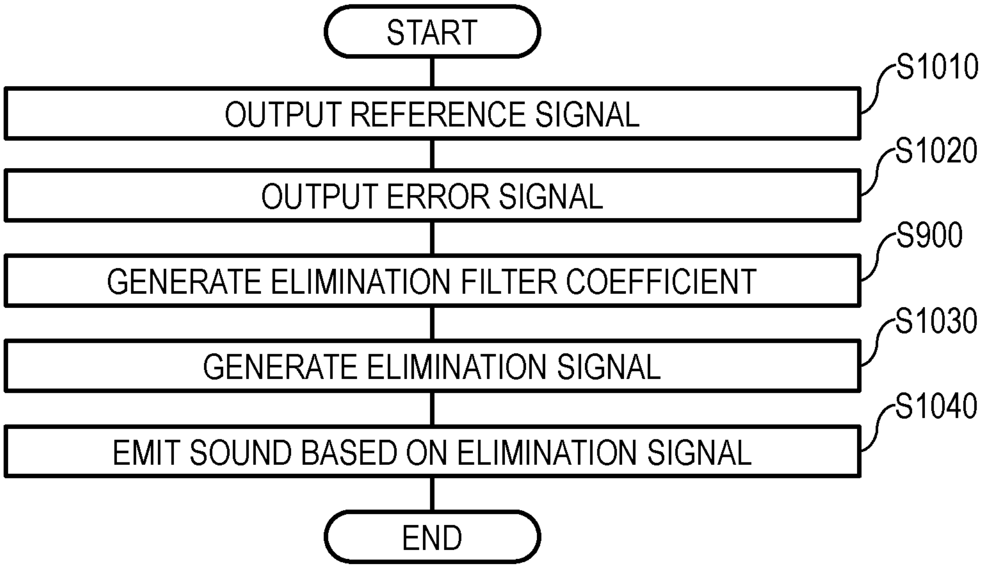
FIG. 2 is a flowchart illustrating an example of an operation of the noise elimination system 1000.
Figure 3:
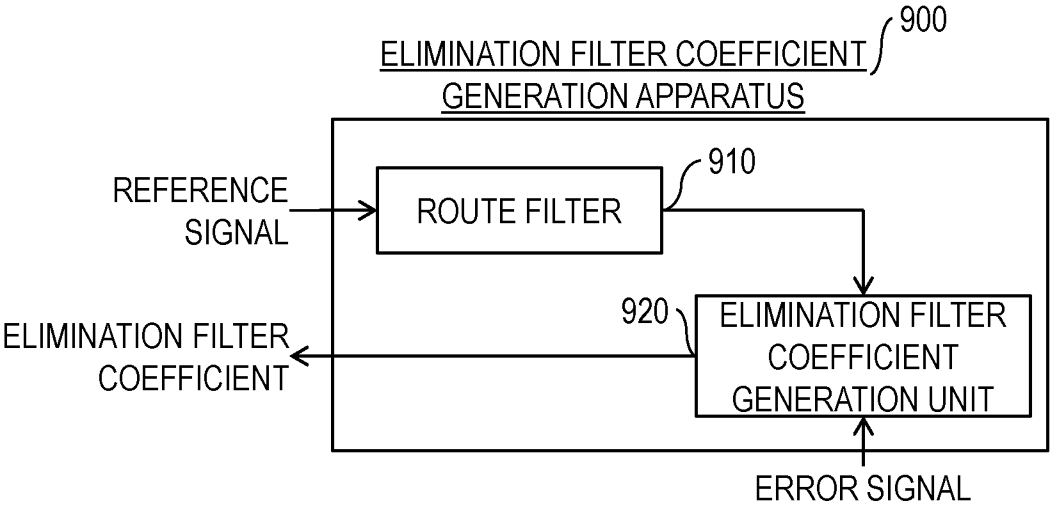
FIG. 3 is a block diagram illustrating an example of a configuration of an elimination filter coefficient generation apparatus 900.
Figure 4:
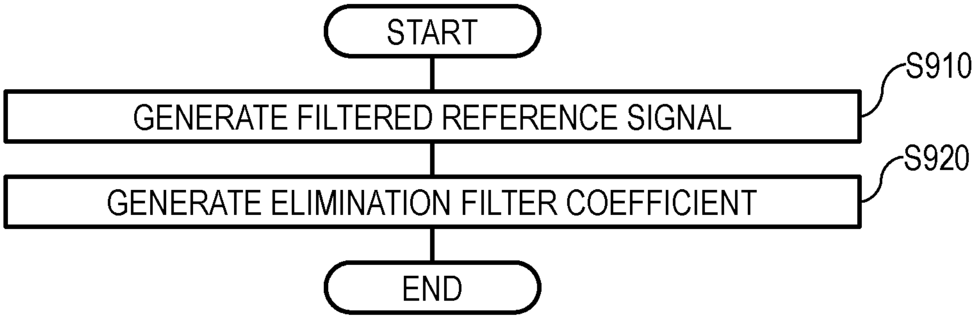
FIG. 4 is a flowchart illustrating an example of an operation of the elimination filter coefficient generation apparatus 900.
Figure 5:
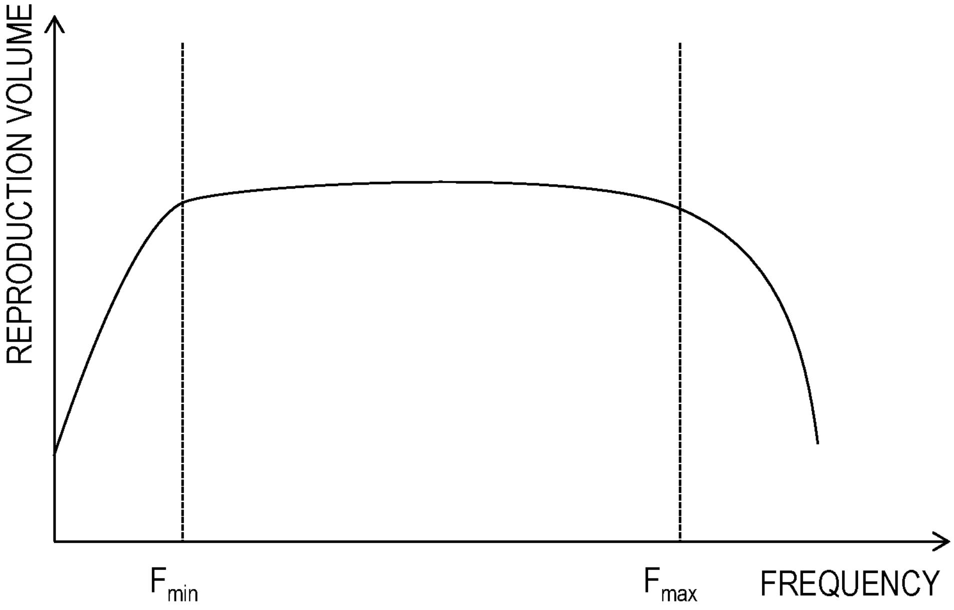
FIG. 5 is a diagram illustrating an example of frequency characteristics of a speaker.

Embodiments of the present invention are described in detail below. Note that components having the same functions are denoted by the same reference numerals, and overlapping descriptions are omitted.

Prior to the description of the embodiments, a notation rule in this specification is described.

^(caret) represents a superscript. For example, $x^{y\hat{}z}$ represents the fact that $y^z$ is a superscript of x, and represents the fact that $y^z$ is a subscript of x. Further, _ (underscore) represents a subscript. For example, $x^{y\_z}$ represents the fact that $y_z$ is a superscript of x, and represents the fact that $y_z$ is a subscript of x.

The superscript '^' A or '~' used as ^x or ~x for a certain character x is originally considered to be written right above 'x', but ^x or ~x is written due to restriction of notation in specification.

First Embodiment

Figure 6:
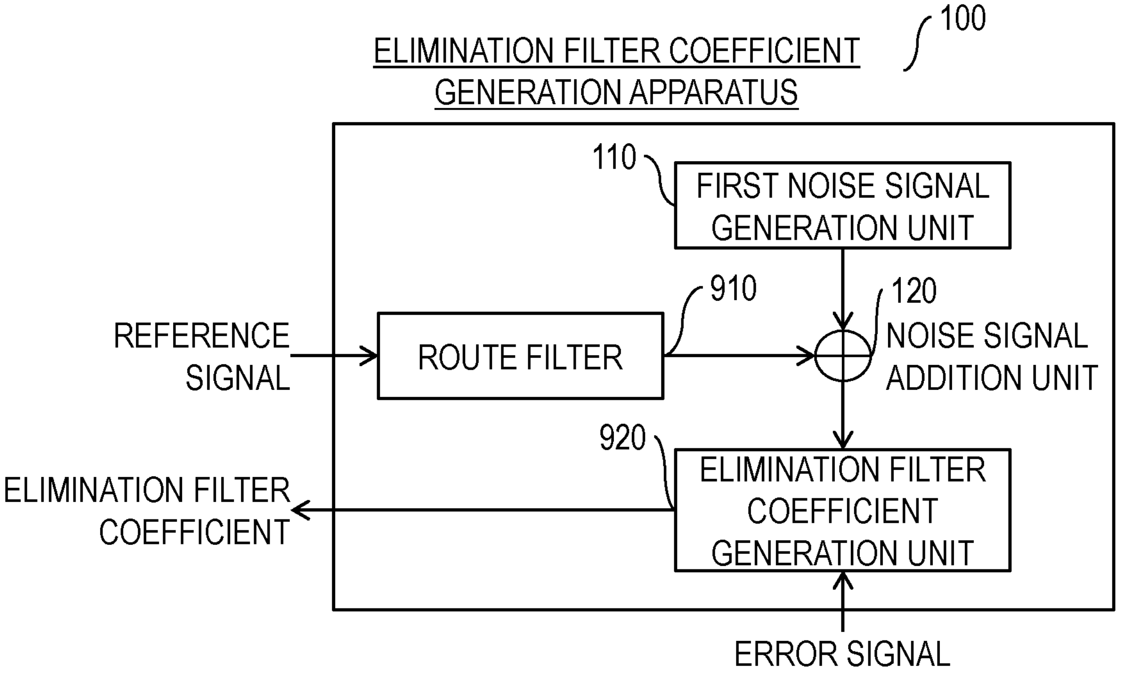
FIG. 6 is a block diagram illustrating an example of a configuration of an elimination filter coefficient generation apparatus 100.
Figure 7:
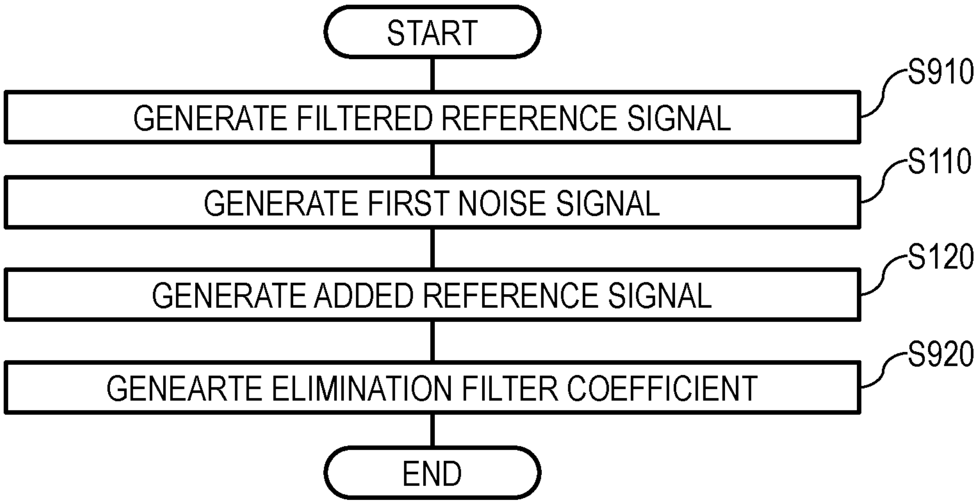
FIG. 7 is a flowchart illustrating an example of an operation of the elimination filter coefficient generation apparatus 100.

Referring to FIG. 6 and FIG. 7, an elimination filter coefficient generation apparatus 100 is described below. FIG. 6 is a block diagram illustrating a configuration of the elimination filter coefficient generation apparatus 100. FIG. 7 is a flowchart illustrating an operation of the elimination filter coefficient generation apparatus 100. As illustrated in FIG. 6, the elimination filter coefficient generation apparatus 100 includes a route filter 910, a first noise signal generation unit 110, a noise signal addition unit 120, and an elimination filter coefficient generation unit 920.

Referring to FIG. 7, the operation of the elimination filter coefficient generation apparatus 100 is described.

In S910, the route filter 910 inputs a reference signal output in S1010, generates a filtered reference signal from the reference signal by filtering using a route filter coefficient indicating acoustic characteristics of a route from the speaker 1040 to the error microphone 1020, and outputs the filtered reference signal.

In S110, the first noise signal generation unit 110 generates a signal having predetermined frequency characteristics and level as a first noise signal, and outputs the first noise signal. For example, the first noise signal generation unit 110 can be configured by using an M-series signal generator and an FIR (Finite Impulse Response) filter or an IIR (Infinite Impulse Response) filter. The first noise signal can be generated by filtering of an output signal of an M-series signal generator (that is, M-series signal) by using an FIR filter or an IIR filter having predetermined frequency characteristics. The M-series signal is a pseudo irregular signal having white frequency characteristics (that is, flat frequency characteristics). By generating a first noise signal by using a pseudo irregular signal such as an M-series signal, the first noise signal becomes a signal uncorrelated to an error signal.

In S120, the noise signal addition unit 120 inputs the filtered reference signal output in S910 and the first noise signal output in S110 and adds the filtered reference signal and the first noise signal to generate an added reference signal, and outputs the added reference signal.

In S920, the elimination filter coefficient generation unit 920 inputs an error signal output in S1020 and the added reference signal output in S120 to generate an elimination filter coefficient from the error signal and the added reference signal, and outputs the elimination filter coefficient.

Figure 8:
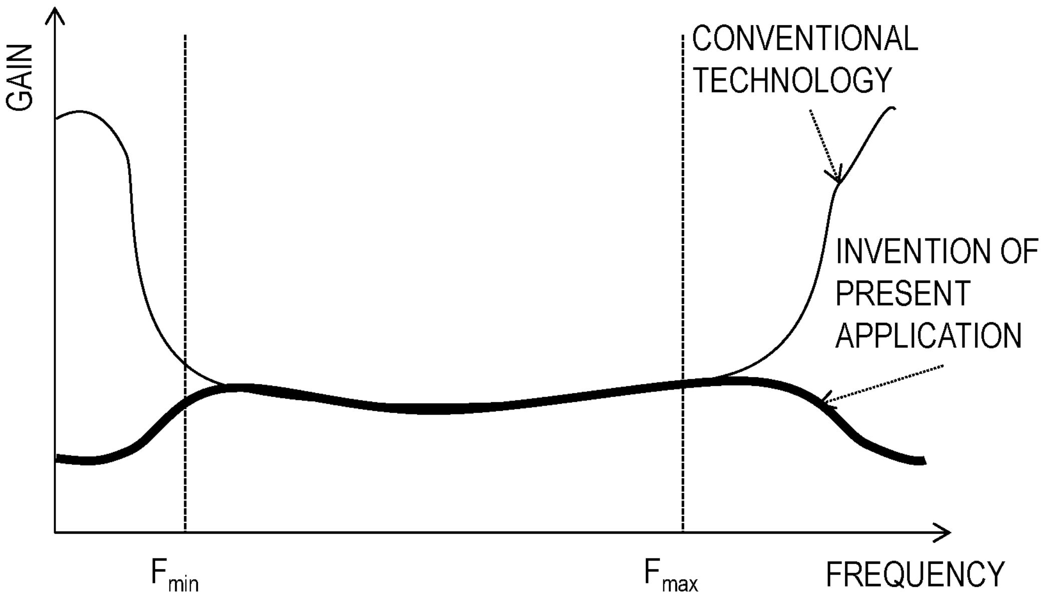
FIG. 8 is a diagram illustrating an example of convergence characteristics of an elimination filter coefficient.

By using the added reference signal generated by using the first noise signal uncorrelated to the error signal, an elimination filter coefficient is learned by an adaptive algorithm such that the gain decreases. When the elimination filter coefficient is learned by the adaptive algorithm by inputting the error signal and the first noise signal, the optimal value of the elimination filter coefficient is 0. As the value of the ratio of the frequency spectral of the first noise signal to the frequency spectral of the filtered reference signal (that is, frequency spectral of first noise signal/frequency spectral of filtered reference signal) becomes larger (that is, as value of frequency spectral of first noise signal becomes relatively larger), the elimination filter coefficient at the frequency is learned such that the gain becomes smaller. When the value of the ratio is small (that is, frequency spectral of filtered reference signal is sufficiently large), the influence of the first noise signal can be ignored, and an elimination filter coefficient capable of eliminating noise can be learned. Thus, in a frequency band where the reproduction volume is small in the frequency characteristics of the speaker, when a signal with which the ratio of the frequency spectral of the first noise signal to the frequency spectral of the filtered reference signal increases is generated as a first noise signal, the elimination filter coefficient has, as illustrated in FIG. 8, no frequency band having a gain that generates a signal exceeding reproduction capability of a speaker for emitting sound based on the elimination signal. Consequently, degradation of noise elimination performance caused by distortion is suppressed.

According to the embodiment of the present invention, a large signal can be prevented from being input in a band outside a reproduction frequency band of the speaker and an elimination filter coefficient for suppressing degradation of noise elimination performance can be generated.

Second Embodiment

Figure 9:
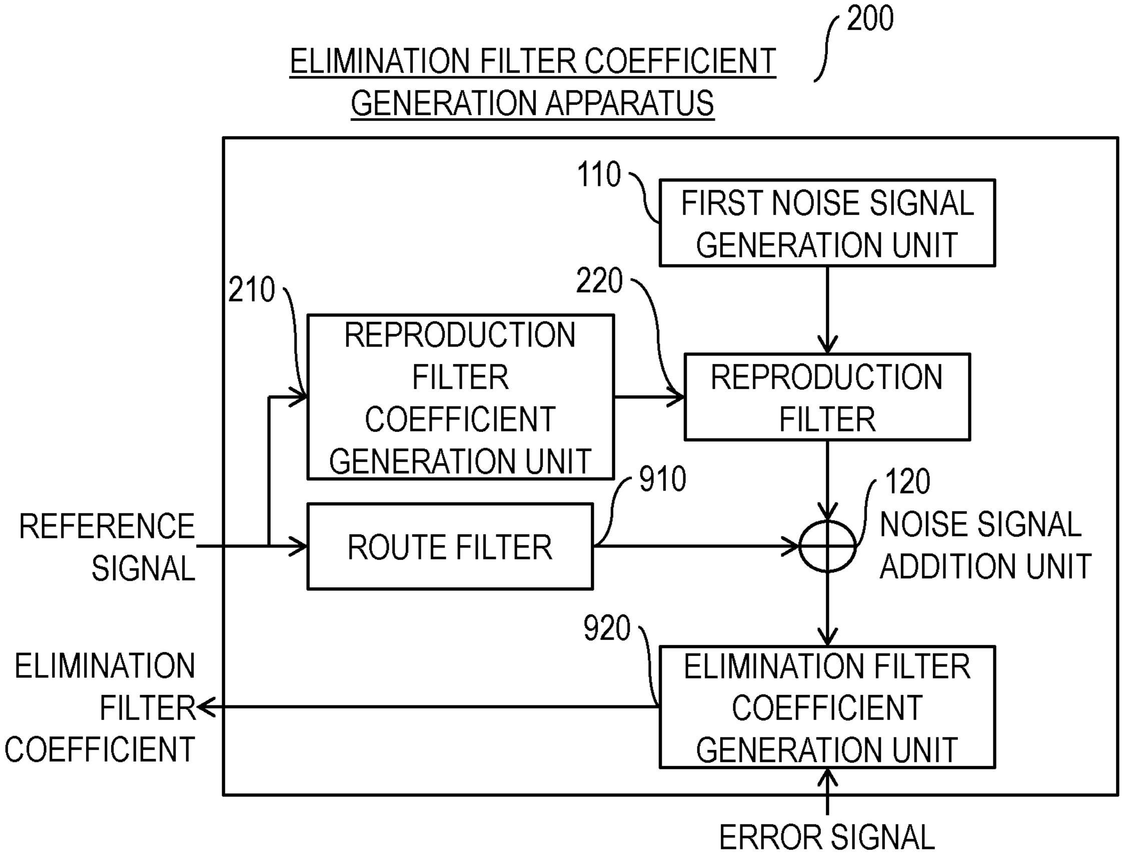
FIG. 9 is a block diagram illustrating an example of a configuration of an elimination filter coefficient generation apparatus 200.
Figure 10:
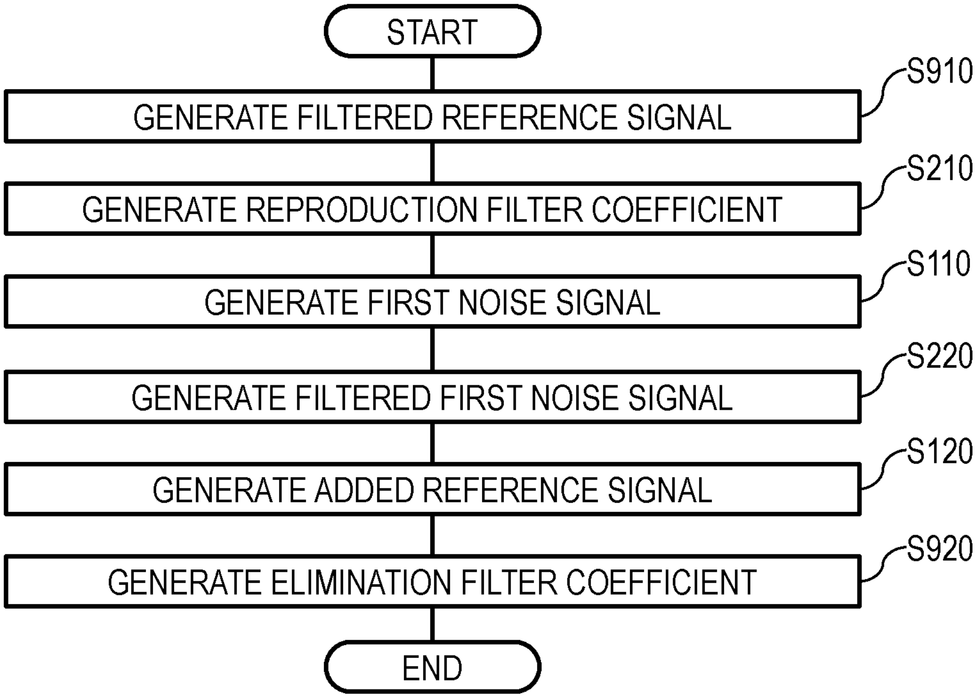
FIG. 10 is a flowchart illustrating an example of an operation of the elimination filter coefficient generation apparatus 200.

Referring to FIG. 9 and FIG. 10, an elimination filter coefficient generation apparatus 200 is described below. FIG. 9 is a block diagram illustrating a configuration of the elimination filter coefficient generation apparatus 200. FIG.

10 is a flowchart illustrating an operation of the elimination filter coefficient generation apparatus 200. As illustrated in FIG. 9, the elimination filter coefficient generation apparatus 200 includes a route filter 910, a reproduction filter coefficient generation unit 210, a first noise signal generation unit 110, a reproduction filter 220, a noise signal addition unit 120, and an elimination filter coefficient generation unit 920.

Referring to FIG. 10, the operation of the elimination filter coefficient generation apparatus 200 is described.

In S910, the route filter 910 inputs a reference signal output in S1010, generates a filtered reference signal from the reference signal by filtering using route filter coefficient indicating acoustic characteristics of a route from the speaker 1040 to the error microphone 1020, and outputs the filtered reference signal.

In S210, the reproduction filter coefficient generation unit 210 inputs the reference signal output in S1010 to generate, from the reference signal, a reproduction filter coefficient indicating frequency characteristics of the reference signal, and outputs the reproduction filter coefficient. For example, the reproduction filter coefficient can be determined by determining the power spectral by converting the reference signal in terms of frequency and performing inverse frequency conversion after normalizing the power spectral.

In S110, the first noise signal generation unit 110 generates a signal having predetermined frequency characteristics and level as a first noise signal, and outputs the first noise signal.

In S220, the reproduction filter 220 inputs the reproduction filter coefficient output in S210 and the first noise signal output in S110, generates a filtered first noise signal from the first noise signal by filtering using the reproduction filter coefficient, and outputs the filtered first noise signal. The filtered first noise signal is a signal in which frequency characteristics of the reference signal has been reflected.

In S120, the noise signal addition unit 120 inputs the filtered reference signal output in S910 and the filtered first noise signal output in S220, adds the filtered reference signal and the filtered first noise signal to generate an added reference signal, and outputs the added reference signal.

In S920, the elimination filter coefficient generation unit 920 inputs an error signal output in S1020 and the added reference signal output in S120 to generate an elimination filter coefficient from the error signal and the added reference signal, and outputs the elimination filter coefficient.

By matching the frequency characteristics of the first noise signal to be added and the frequency characteristics of the reference signal, the elimination filter coefficient can be learned so as to decrease in a frequency band where the gain of the route filter coefficient is small. Even when the characteristics of a route from the speaker to the error microphone has been unknown, the degradation of noise elimination performance caused by distortion can be suppressed.

According to the embodiment of the present invention, a large signal can be prevented from being input in a band outside a reproduction frequency band of the speaker and an elimination filter coefficient for suppressing degradation of noise elimination performance can be generated.

Third Embodiment

Figure 11:
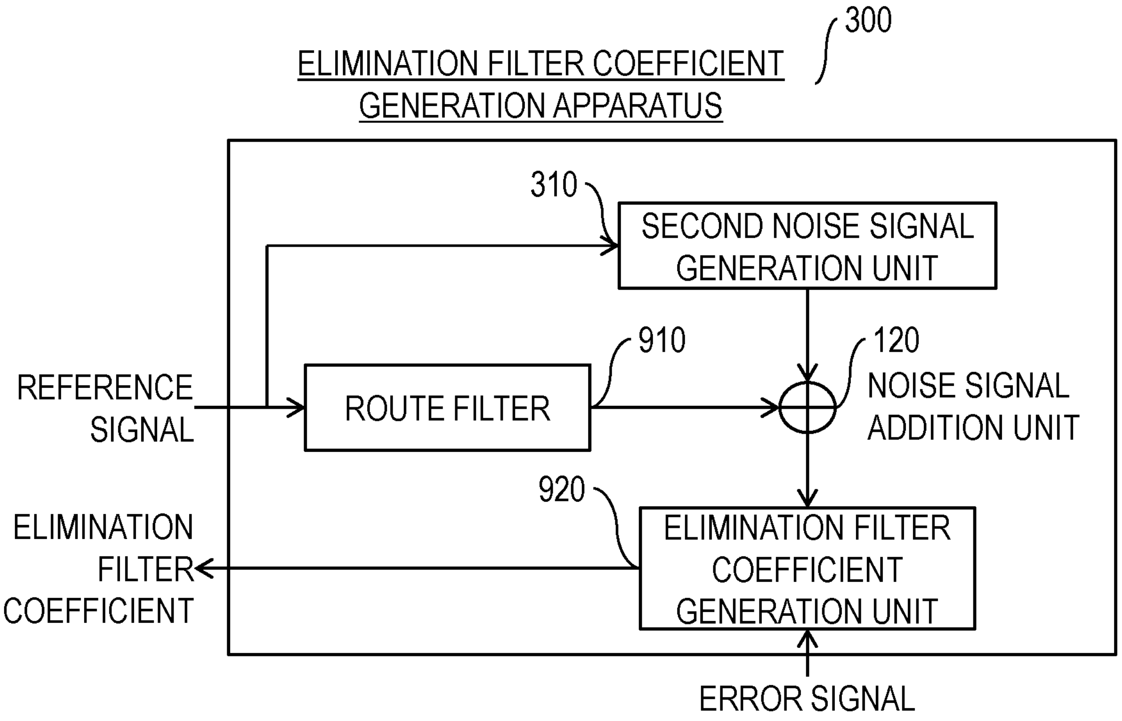
FIG. 11 is a block diagram illustrating an example of a configuration of an elimination filter coefficient generation apparatus 300.
Figure 12:
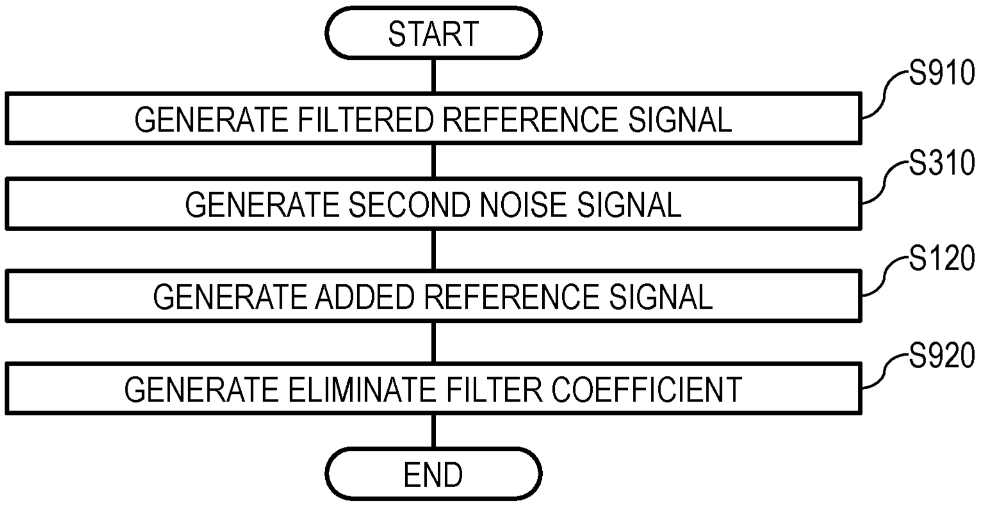
FIG. 12 is a flowchart illustrating an example of an operation of the elimination filter coefficient generation apparatus 300.

Referring to FIG. 11 and FIG. 12, an elimination filter coefficient generation apparatus 300 is described below. FIG. 11 is a block diagram illustrating a configuration of the elimination filter coefficient generation apparatus 300. FIG. 12 is a flowchart illustrating an operation of the elimination filter coefficient generation apparatus 300. As illustrated in FIG. 11, the elimination filter coefficient generation apparatus 300 includes a route filter 910, a second noise signal generation unit 310, a noise signal addition unit 120, and an elimination filter coefficient generation unit 920.

Referring to FIG. 12, the operation of the elimination filter coefficient generation apparatus 300 is described.

In S910, the route filter 910 inputs a reference signal output in S1010, generates a filtered reference signal from the reference signal by filtering using a route filter coefficient indicating acoustic characteristics of a route from the speaker 1040 to the error microphone 1020, and outputs the filtered reference signal.

In S310, the second noise signal generation unit 310 inputs the reference signal output in S1010, applies a predetermined gain to the reference signal to add a predetermined delay and generate a second noise signal, and outputs the second noise signal. The predetermined gain may be a value in the range from 0 to the maximum value of the gain of the route filter coefficient. As the gain becomes larger, the gain of the elimination filter coefficient is learned so as to be smaller. A frequency band where the gain of the elimination filter coefficient needs to be smaller can be set in advance. The predetermined delay may be set to a time with which autocorrelation of noise becomes sufficiently small. For example, the delay is about several hundreds of ms to several seconds.

In S120, the noise signal addition unit 120 inputs the filtered reference signal output in S910 and the second noise signal output in S310, adds the filtered reference signal and the second noise signal to generate an added reference signal, and outputs the added reference signal.

In S920, the elimination filter coefficient generation unit 920 inputs the error signal output in S1020 and the added reference signal output in S120, generates an elimination filter coefficient from the error signal and the added reference signal, and outputs the elimination filter coefficient.

In the elimination filter coefficient generation apparatus 300, the processing for estimating frequency characteristics of the reference signal (that is, processing in reproduction filter coefficient generation unit 210) and the processing for generating a noise signal uncorrelated to the error signal (that is, processing in first noise signal generation unit 110), which are required in the elimination filter coefficient generation apparatus 200, becomes unnecessary. Similarly to the elimination filter coefficient generation apparatus 200, the elimination filter coefficient can be learned so as to decrease in a frequency band where the gain of the route filter coefficient is small, and hence even when the characteristics of a route from the speaker to the error microphone has been unknown, the degradation of noise elimination performance caused by distortion can be suppressed.

According to the embodiment of the present invention, a large signal can be prevented from being input in a band outside a reproduction frequency band of the speaker and an elimination filter coefficient for suppressing degradation of noise elimination performance can be generated.

Fourth Embodiment

Figure 13:
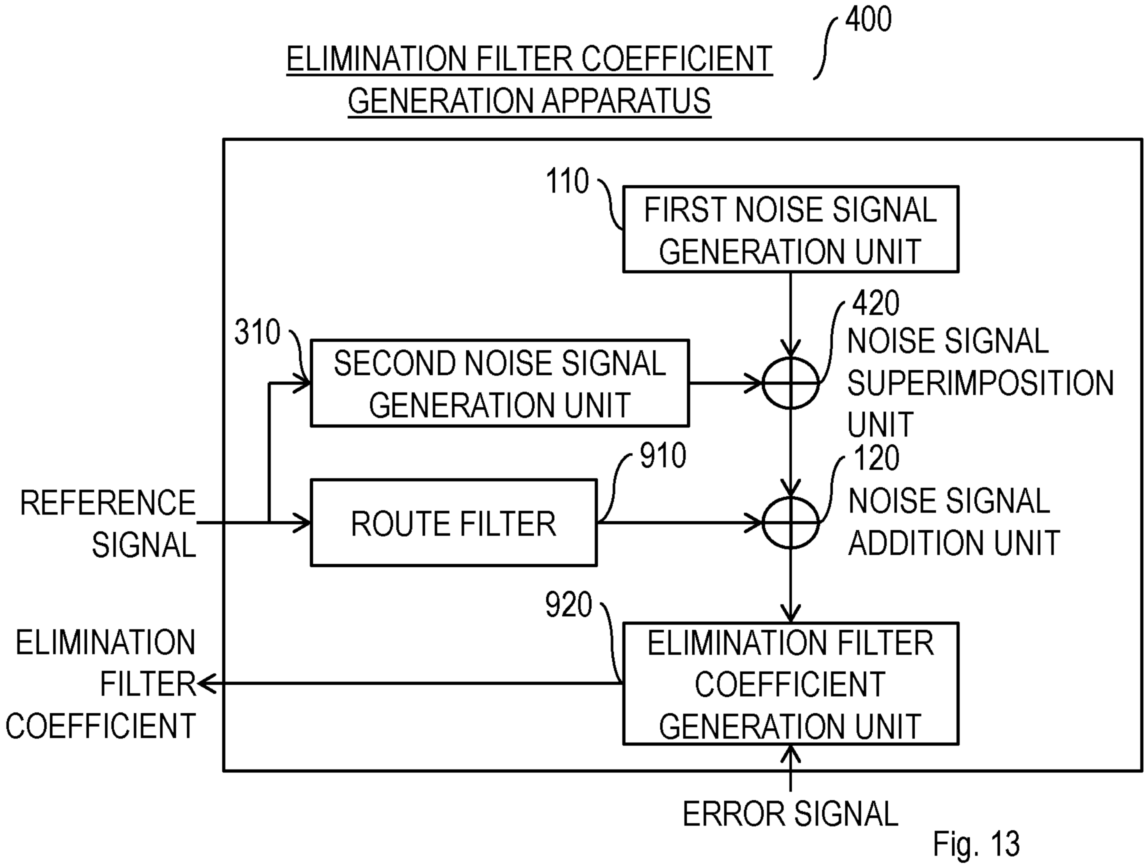
FIG. 13 is a block diagram illustrating an example of a configuration of an elimination filter coefficient generation apparatus 400.
Figure 14:
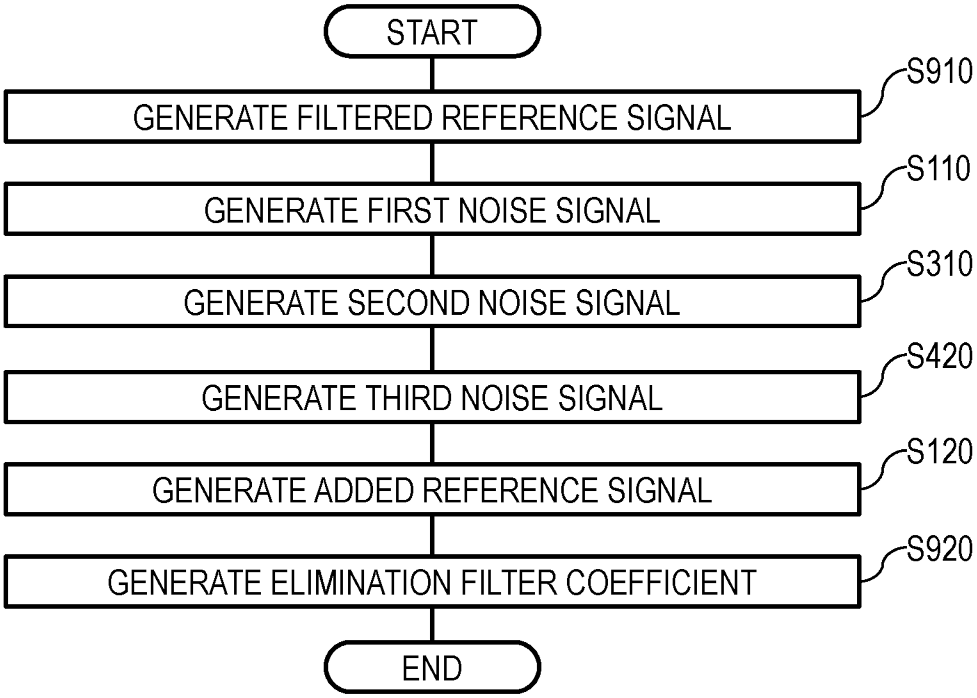
FIG. 14 is a flowchart illustrating an example of an operation of the elimination filter coefficient generation apparatus 400.

Referring to FIG. 13 and FIG. 14, an elimination filter coefficient generation apparatus 400 is described below. FIG. 13 is a block diagram illustrating a configuration of the elimination filter coefficient generation apparatus 400. FIG. 14 is a flowchart illustrating an operation of the elimination filter coefficient generation apparatus 400. As illustrated in FIG. 13, the elimination filter coefficient generation apparatus 400 includes a route filter 910, a first noise signal generation unit 110, a second noise signal generation unit 310, a noise signal superimposition unit 420, a noise signal addition unit 120, and an elimination filter coefficient generation unit 920.

Referring to FIG. 14, the operation of the elimination filter coefficient generation apparatus 400 is described.

In S910, the route filter 910 inputs a reference signal output in S1010, generates a filtered reference signal from the reference signal by filtering using a route filter coefficient indicating acoustic characteristics of a route from the speaker 1040 to the error microphone 1020, and outputs the filtered reference signal.

In S110, the first noise signal generation unit 110 generates a signal having predetermined frequency characteristics and level as a first noise signal, and outputs the first noise signal.

In S310, the second noise signal generation unit 310 inputs the reference signal output in S1010, applies a predetermined gain to the reference signal to add a predetermined delay and generate a second noise signal, and outputs the second noise signal.

In S420, the noise signal superimposition unit 420 inputs the first noise signal output in S110 and the second noise signal output in S310, adds the first noise signal and the second noise signal to generate a third noise signal, and outputs the third noise signal.

In S120, the noise signal addition unit 120 inputs the filtered reference signal output in S910 and the third noise signal output in S420, adds the filtered reference signal and the third noise signal to generate an added reference signal, and outputs the added reference signal.

In S920, the elimination filter coefficient generation unit 920 inputs the error signal output in S1020 and the added reference signal output in S120, generates an elimination filter coefficient from the error signal and the added reference signal, and outputs the elimination filter coefficient.

The elimination filter coefficient generation apparatus 400 can learn the elimination filter coefficient so as to decrease in a frequency band where the gain of the route filter coefficient is small, and further can set a frequency band where the gain of the elimination filter coefficient needs to be small in advance.

According to the embodiment of the present invention, a large signal can be prevented from being input in a band outside a reproduction frequency band of the speaker and an elimination filter coefficient for suppressing degradation of noise elimination performance can be generated.

<Noise Elimination System>

The elimination filter coefficient generation apparatus 100/200/300/400 can be used for a noise elimination system 1000 instead of the elimination filter coefficient generation apparatus 900. Specifically, the noise elimination system 1000 includes a reference microphone 1010, an error microphone 1020, the elimination filter coefficient generation apparatus 100/200/300/400, an elimination filter 1030, and a speaker 1040.

The noise elimination system 1000 includes one reference microphone 1010 and one error microphone 1020, but may include two or more reference microphones 1010 and two or more error microphones 1020. In this case, the noise elimination system 1000 may have a configuration in which one pair of the elimination filter 1030 and the elimination filter coefficient generation apparatus 100/200/300/400 is provided for one pair of the reference microphone 1010 and the error microphone 1020.

<Supplementary Note>

Figure 15:
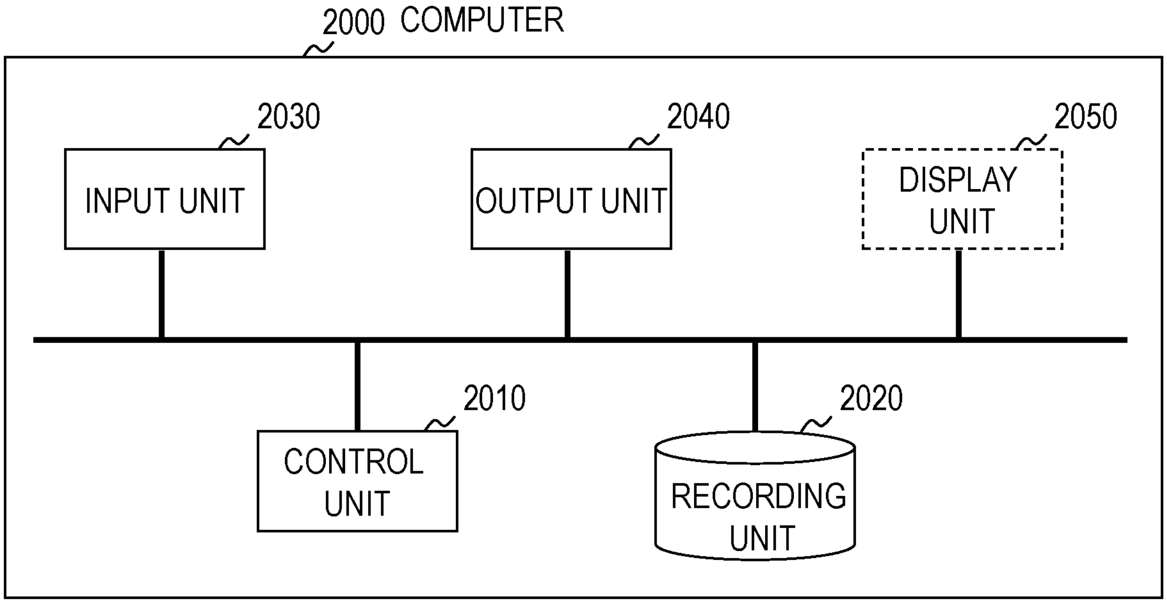
FIG. 15 is a diagram illustrating an example of a functional configuration of a computer for implementing apparatuses in embodiments of the present invention.

FIG. 15 is a diagram illustrating an example of a functional configuration of a computer for implementing the above-mentioned apparatuses. Processing in the above-mentioned apparatuses can be implemented by controlling a recording unit 2020 to read a program for causing a computer to function as the above-mentioned apparatuses and causing a control unit 2010, an input unit 2030, and an output unit 2040 to operate the program.

The apparatus according to this invention includes, as one hardware entity, for example, an input unit to which a keyboard or the like can be connected, an output unit to which a liquid crystal display or the like can be connected, a communication unit to which a communication device (e.g., communication cable) capable of communicating with the outside of the hardware entity can be connected, a CPU (Central Processing Unit, which may include a cache memory or a register, for example), a RAM or ROM being a memory, an external storage device being a hard disk, and a bus connecting the input unit, the output unit, the communication unit, the CPU, the RAM, the ROM, and the external storage device to one another so as to enable exchange of data. Further, as the necessity arises, a device (drive) capable of reading/writing data from/to a storage medium such as a CD-ROM may be provided in the hardware entity. A physical entity including such hardware resources is, for example, a general computer.

The external storage device of the hardware entity stores, for example, a program necessary for implementing the above-mentioned function and data necessary for processing of this program (Instead of the external storage device, a ROM being a read-only storage device may store the program, for example). Further, data or the like obtained by processing of the program is appropriately stored in a RAM or external storage device, for example.

In the hardware entity, each program stored in the external storage device (or ROM or the like) and data necessary for processing of each program are read into the memory as necessary, and are appropriately interpreted, executed, and processed by the CPU. As a result, the CPU implements a predetermined function (each component represented by unit, means, or the like in the above description).

The present invention is not limited to the above-mentioned embodiments, and can be modified appropriately without departing from the gist of the present invention. Further, the processing described in the above-mentioned embodiments may not always be executed chronologically in order of description, but may be executed in parallel or individually depending on the necessity or the processing capability of a device configured to execute processing.

As described above, when a computer implements the processing functions of the hardware entity (apparatus according to present invention) described in the above-mentioned embodiments, the details of processing of functions to be included in the hardware entity are described in a program. Then, the computer executes the program, so that the processing functions of the hardware entity are implemented on the computer.

The program describing the details of processing can be recorded in a computer-readable storage medium. The computer-readable storage medium may be, for example, any medium such as a magnetic storage device, an optical disc, a magneto-optical recording medium, or a semiconductor memory. Specifically, for example, a hard disk drive, a flexible disc, a magnetic tape, or the like can be used as the magnetic storage device. A DVD (Digital Versatile Disc), a DVD-RAM (Random Access Memory), a CD-ROM (Compact Disc Read Only Memory), a CD-R (Recordable)/RW (ReWritable), or the like can be used as the optical disc. An MO (Magneto-Optical disc) or the like can be used as the magneto-optical recording medium. An EEP-ROM (Electronically Erasable and Programmable-Read Only Memory) or the like can be used as the semiconductor memory.

Further, the program is distributed by, for example, selling, transferring, or lending a portable storage medium such as a DVD or CD-ROM recording the program. Further, a configuration may be adopted, in which the program is stored in a storage device of a server computer, and the program is distributed by transferring the program from the server computer to other computers.

A computer that executes such a program first temporarily stores, into an own recording device, a program recorded in the portable storage medium or a program transferred from the server computer, for example. Then, at the time of execution of processing, the computer reads the program stored in the own recording device, and executes processing in accordance with the read program. Further, as another execution mode of the program, the computer may directly read a program from the portable storage medium, and execute processing in accordance with the program. Further, every time the server computer transfers a program to the computer, the computer may sequentially execute processing in accordance with the received program. Further, the server computer may not transfer a program to the computer, but may be configured to execute the above-mentioned processing by a so-called ASP (Application Service Provider) service, which implements processing functions by simply giving an execution command and obtaining a result. The program in this mode is information to be provided for processing by an electronic computational machine, and includes data (e.g., data with property specifying processing of a computer without directly giving a command to the computer) equivalent to a program.

Further, in this mode, the hardware entity is configured by executing a predetermined program on a computer. However, at least a part of details of the processing may be implemented by hardware.

Description of the above-mentioned embodiments of the present invention is given for the purpose of exemplification and description. The description is not intended to be exhaustive, and the invention is not intended to be limited to the exact disclosed format. Modification or variation can be made based on the above-mentioned teaching. The embodiments are selected and represented to provide most appropriate exemplification of the principle of the present invention, and to enable a person skilled in the art to use the present invention in the form of various embodiments or by adding various modifications thereto so as to adapt to considered actual usage. All such modifications and variations fall within the scope of the present invention defined by the appended claims interpreted in accordance with a range given fairly, legally, and equally.

The invention claimed is:

1. An elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, the elimination filter coefficient generation method comprising:

a route filtering step for generating a filtered reference signal from the reference signal by filtering using a route filter coefficient indicating acoustic characteristics of a route from a speaker for emitting sound based on the elimination signal to the error microphone;

a first noise signal generation step for generating a signal having predetermined frequency characteristics and level as a first noise signal;

a noise signal addition step for generating an added reference signal from the filtered reference signal and the first noise signal; and an elimination filter coefficient generation step for generating, from the error signal and the added reference signal, as the elimination filter coefficient, an elimination filter coefficient with which a signal exceeding a specification range of the speaker is not generated.

2. The elimination filter coefficient generation method according to claim 1, wherein the first noise signal is a signal that is uncorrelated to the error signal.

3. The elimination filter coefficient generation method according to claim 1, wherein the first noise signal is a signal with which a ratio of a frequency spectral of the first noise signal to a frequency spectral of the filtered reference signal increases in a frequency band where reproduction volume is small in frequency characteristics of the speaker.

4. A non-transitory computer-readable recording medium storing a program for causing a computer to execute the elimination filter coefficient generation method according to claim 1.

5. An elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, the elimination filter coefficient generation method comprising:

a route filtering step for generating a filtered reference signal from the reference signal by filtering using a route filter coefficient indicating acoustic characteristics of a route from a speaker for emitting sound based on the elimination signal to the error microphone;

a reproduction filter coefficient generation step for generating, from the reference signal, a reproduction filter coefficient indicating frequency characteristics of the reference signal;

a first noise signal generation step for generating a signal having predetermined frequency characteristics and level as a first noise signal;

a reproduction filtering step for generating a filtered first noise signal from the first noise signal by filtering using the reproduction filter coefficient;

a noise signal addition step for generating an added reference signal from the filtered reference signal and the filtered first noise signal; and an elimination filter coefficient generation step for generating the elimination filter coefficient from the error signal and the added reference signal.

6. A non-transitory computer-readable recording medium storing a program for causing a computer to execute the elimination filter coefficient generation method according to claim 5.

7. An elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, the elimination filter coefficient generation method comprising:

a route filtering step for generating a filtered reference signal from the reference signal by filtering using a route filter coefficient indicating acoustic characteristics of a route from a speaker for emitting sound based on the elimination signal to the error microphone;

a second noise signal generation step for generating a second noise signal by applying a predetermined gain to the reference signal to add a predetermined delay;

a noise signal addition step for generating an added reference signal from the filtered reference signal and the second noise signal; and an elimination filter coefficient generation step for generating the elimination filter coefficient from the error signal and the added reference signal.

8. A non-transitory computer-readable recording medium storing a program for causing a computer to execute the elimination filter coefficient generation method according to claim 5.

9. An elimination filter coefficient generation method in which an elimination filter coefficient generation apparatus inputs a reference signal output from a reference microphone for collecting noise in a predetermined space and an error signal output from an error microphone for collecting sound at a position that needs to be silent and generates an elimination filter coefficient used for filtering for generating an elimination signal for eliminating noise at the position that needs to be silent from the reference signal, wherein the elimination filter coefficient has no frequency band having a gain that generates a signal exceeding reproduction capability of a speaker for emitting sound based on the elimination signal.

10. A non-transitory computer-readable recording medium storing a program for causing a computer to execute the elimination filter coefficient generation method according to claim 9.

11. An elimination filter coefficient generation apparatus for inputting a reference signal output from a reference microphone for collecting noise in a predetermined space and an error signal output from an error microphone for collecting sound at a position that needs to be silent, and generating an elimination filter coefficient used for filtering for generating an elimination signal for eliminating noise at the position that needs to be silent from the reference signal, the elimination filter coefficient generation apparatus comprising:

a route filter for generating a filtered reference signal from the reference signal by filtering using a route filter coefficient indicating acoustic characteristics of a route from a speaker for emitting sound based on the elimination signal to the error microphone;

a first noise signal generation circuitry for generating a signal having predetermined frequency characteristics and level as a first noise signal;

a noise signal addition circuitry for generating an added reference signal from the filtered reference signal and the first noise signal; and an elimination filter coefficient generation circuitry for generating, from the error signal and the added reference signal, as the elimination filter coefficient, an elimination filter coefficient with which a signal exceeding a specification range of the speaker is not generated.

* * * * *